(12) United States Patent
Perstnev et al.

(10) Patent No.: US 11,009,173 B2
(45) Date of Patent: *May 18, 2021

(54) METHOD FOR SEALING PIPELINES USING A GEL PIG

(71) Applicant: CURAPIPE SYSTEM LTD., Ashkelon (IL)

(72) Inventors: Samuel Perstnev, Mercaz Shapira (IL); Boris Natapov, Ashkelon (IL); Alexander Perstnev, Ashkelon (IL); Reonald Ukhanov, Ashkelon (IL); Peter Paz, Har Adar (IL)

(73) Assignee: CURAPIPE SYSTEM LTD., Ashkelon (IL)

( * ) Notice: Subject to any disclaimer, the term of this patent is extended or adjusted under 35 U.S.C. 154(b) by 49 days.

This patent is subject to a terminal disclaimer.

(21) Appl. No.: 16/372,454

(22) Filed: Apr. 2, 2019

(65) Prior Publication Data
US 2019/0226623 A1     Jul. 25, 2019

Related U.S. Application Data

(63) Continuation-in-part of application No. 15/535,991, filed as application No. PCT/IL2015/000052 on Dec. 18, 2015, now Pat. No. 10,302,236.

(Continued)

(51) Int. Cl.
| | |
|---|---|
| *F16L 55/1645* | (2006.01) |
| *F16L 55/18* | (2006.01) |
| *C09K 3/12* | (2006.01) |
| *F16L 55/38* | (2006.01) |
| *F16L 55/42* | (2006.01) |
| *F16L 55/10* | (2006.01) |
| *F16L 55/164* | (2006.01) |

(52) U.S. Cl.
CPC ............ *F16L 55/1645* (2013.01); *C09K 3/12* (2013.01); *F16L 55/1011* (2013.01); *F16L 55/164* (2013.01); *F16L 55/18* (2013.01); *F16L 55/38* (2013.01); *F16L 55/42* (2013.01)

(58) Field of Classification Search
CPC ..... F16L 55/1645; F16L 55/128; F16L 55/64; F16L 55/16455; F16L 55/164; F16L 55/18; F16L 55/38; F16L 55/42; C08K 3/22; C08K 3/36; C08K 3/12; C08K 5/01; C08K 2003/2227; C09K 3/12
USPC .......................................................... 138/97
See application file for complete search history.

(56) References Cited

U.S. PATENT DOCUMENTS 3,144,049 A * 8/1964 Ginsburgh ............ E21B 33/138
                                                            138/97
4,003,393 A ‡ 1/1977 Jaggard ................. B08B 9/0555
                                                            134/22.14

(Continued)

FOREIGN PATENT DOCUMENTS

GB           2274699 A   ‡ 8/1994    .......... F16L 55/1645

*Primary Examiner* — Craig M Schneider
*Assistant Examiner* — David E Deal
(74) *Attorney, Agent, or Firm* — Eva Taksel

(57) ABSTRACT

The present invention provides methods and methods for curing a leakage in a pipeline, the method including at least one gel pig and at least one sealant composition; wherein the at least one gel pig and the at least one sealant composition form a pig train, adapted to move along the pipeline to a region of the leakage and to seal the leakage.

16 Claims, 6 Drawing Sheets

Related U.S. Application Data

(60) Provisional application No. 62/093,862, filed on Dec. 18, 2014.

(56) References Cited

U.S. PATENT DOCUMENTS

| | | | | |
|---|---|---|---|---|
| 4,254,559 A ‡ | 3/1981 | Purinton, Jr. | B08B 9/0555 | 34/342 |
| 4,379,722 A ‡ | 4/1983 | Scott | F16L 55/1011 | 106/287.17 |
| 4,383,783 A ‡ | 5/1983 | Kruka | B08B 9/0555 | 106/266 |
| 4,416,703 A ‡ | 11/1983 | Scott | B08B 9/0555 | 134/22.11 |
| 4,543,131 A ‡ | 9/1985 | Purinton, Jr. | B08B 9/0555 | 134/22.11 |
| 4,582,091 A ‡ | 4/1986 | Ells | F16L 55/164 | 138/89 |
| 5,122,549 A ‡ | 6/1992 | Holtmyer | C09K 8/5756 | 523/130 |
| 5,215,781 A ‡ | 6/1993 | Lowther | F16L 58/02 | 134/15 |
| 5,346,339 A ‡ | 9/1994 | Himes | B08B 9/0555 | 134/8 |
| 5,358,043 A ‡ | 10/1994 | Moradi-Araghi | C09K 8/887 | 166/270 |
| 2008/0026958 A1‡ | 1/2008 | Todd | C09K 8/512 | 507/214 |
| 2008/0035338 A1‡ | 2/2008 | Pauls | C09K 8/08 | 166/278 |
| 2008/0217012 A1‡ | 9/2008 | Delorey | C09K 8/703 | 166/300 |
| 2012/0325329 A1‡ | 12/2012 | Schwartz | F17D 1/05 | 137/1 |
| 2014/0311605 A1‡ | 10/2014 | Perstnev | F16L 55/1645 | 138/97 |

\* cited by examiner

‡ imported from a related application

METHOD FOR SEALING PIPELINES USING A GEL PIG

FIELD OF THE INVENTION

The present invention relates generally to gel pigs for use in pipelines and methods for producing them, and more specifically to methods and apparatus for use in water pipelines.

BACKGROUND OF THE INVENTION

Many liquids are transported via subterranean/underwater pipelines. When a leakage crack or hole forms in the pipeline, the liquid leaks therefrom. Often, it takes a long time to detect a leakage and yet longer to locate the leakage site. Oil, gas and water transportation are thus subject to tremendous losses due to pipeline leakage.

There is thus a need to maintain and seal subterranean/underwater pipelines quickly in situ.

Several patent publications in the field include U.S. Pat. No. 3,523,826A which relates to a process for cleaning a piping system which is characterized by circulating in, and through said system a thixotropic emulsion having a hi.-h volume ratio of internal phase to external phase, the emulsion having an emulsifying agent, an emulsifiable oil and a non-oil, the emulsion being an oil-in-non-oil or a non-oil-in-oil emulsion, the internal phase of said emulsion being present in said emulsion in an amount of at least 80% by volume of the emulsion, said emulsion having the characteristics of a solid when at rest and the characteristics of a liquid when a force is exerted on it, said emulsion tending to be non-adhesive, said emulsion having a critical shear point sufficient to permit pumping at high rates, and said emulsion having an apparent rest viscosity greater than about 1000 cps.

U.S. Pat. No. 4,216,026 describes a method for removing fluid and/or particulate debris from a pipeline, a Bingham plastic fluid plug is passed through a pipeline and the fluid and/or debris are collected by the plug. The plug is pushed through the pipeline with a scraper which in turn may be pushed by liquid or gas pressure. Where the fluid to be removed is water, the Bingham plastic fluid plug employed preferably is a composition of water and a xanthan gum, and the gum may be cross-linked with a multivalent metal. Where the fluid to be removed is a hydrocarbon, the Bingham plastic fluid plug employed preferably is a composition of a mineral oil and an organo-modified smectite, and may also include a particulate filler such as powdered coal.

U.S. Pat. No. 4,252,465A describes a gel plug, which is employed during construction of an offshore pipeline to separate a gas-filled portion of the pipeline from a water-flooded portion, and to facilitate control and movement of the gas/gel plug/water interface as desired to assist in construction operations.

U.S. Pat. No. 4,254,559A relates to an interior surface of a pipeline being dried by sequentially passing through the pipeline (a) an aqueous cross-linked gelled pig, (b) a fluid mobility buffer comprising a non-cross-linked gelled ankanol of from one to three carbon atoms, (c) a desiccating amount of a liquid alkanol from one to three carbon atoms. For example, a pipeline was dried by sequentially passing through it (a) a borate cross-linked hydroxypropyl guar gum pig, (b) a fluid mobility buffer comprising methanol thickened with hydroxypropyl cellulose, and (c) methanol.

U.S. Pat. No. 4,379,722 discloses a gel plug of mineral oil, organo-modified smectite, and a particulate filler such as powdered coal, or a gel plug of mineral oil and organo-modified smectite is employed during construction of an off-shore pipeline to separate a gas-filled portion of the pipeline from a water-flooded portion, and to facilitate control and movement of a gas/gel plug/water interface as desired to assist in construction operations.

U.S. Pat. No. 4,416,703 describes a method to remove particulate debris from a pipeline, a plug train including at least one gel plug having debris entraining characteristics and at least one pseudoplastic plug is passed through a pipeline and the debris is collected by the gel plug. The gel plug is pushed through the pipeline with a scraper which in turn may be pushed by liquid or gas pressure.

U.S. Pat. No. 4,321,968A discloses gelled compositions comprising carboxymethylhydroxyethyl cellulose in aqueous brine solutions, which are gelled by the addition of an alkaline earth metal hydroxide such as calcium hydroxide. The gelled compositions have utility as water diversion agents, pusher fluids, fracturing fluids, drilling muds, workover fluids, and completion fluids.

U.S. Pat. No. 5,346,339A provides a method of cleaning a pipeline using a gel pig of a graft copolymer of a hydroxyalkyl cellulose prepared by a redox reaction with vinyl phosphonic acid. The gel pig is formed by hydrating the graft copolymer in an aqueous liquid. The gel pig is crosslinked by the addition of a Lewis base or Bronsted-Lowry base, to the gel in an amount sufficient to initiate crosslinking of the graft copolymer. Contaminants entrained in the crosslinked gel pig during the cleaning process may be separated by the addition of a pH reducing agent to the pig whereby the viscosity of the gel is caused to decrease. The gel may be used for further cleaning after contaminant separation by addition of an additional quantity of the Lewis base or Bronsted-Lowry base.

US2003109385A provides a process for treating a hydrocarbon-bearing formation having at least one hydrocarbon bearing zone and at least one water bearing zone wherein the ratio of the permeability of the hydrocarbon bearing zone(s) to the permeability of the water bearing zone(s) is in the range of from 1:20 to 3:1 comprising: a) sequentially injecting into the formation: (i) an aqueous polymer solution comprising 0.01 to 0.5 weight percent of a water-soluble polymer having from 0.01 to 7.5 mole percent of crosslinkable carboxylate and/or phosphonate groups and a molecular weight in the range of 250,000 to 12,000,000; and (ii) an aqueous solution of a crosslinking agent; and b) back-producing the aqueous polymer solution over the crosslinking agent so that the polymer crosslinks within the formation to form a gel which is collapsible to allow hydrocarbon flow.

US2008277112A discloses a method for treating a portion of a subterranean formation or a propellant pack is provided. In general, the method comprises the steps of: (A) forming or providing a treatment fluid comprising: (i) water; (ii) a chelating agent capable of forming a heterocyclic ring that contains a metal ion attached to at least two nonmetal ions; and (iii) a viscosity-increasing agent; and (B) introducing the treatment fluid into the wellbore under sufficient pressure to force the treatment fluid into the matrix of the formation or the propellant pack.

WO2008081441 describes a method of repairing leakage in pipelines comprising the steps of forming a first and second openings in the pipeline upstream and downstream, respectively, of the leakage location, inserting through the first opening a first body, filling the space arrear of the first body (C1) with a first viscous sealing material (M1), inserting through the first opening a second body (C2) arrear of the first viscous sealing material (M1) compressing the first sealing material by applying a pressure against the first and the second bodies (C1, C2) in opposite directions, causing the first and second bodies (C1, C2) and the compressed first sealing material (M1) to move in unison in the direction of the second opening, and retrieving the first and second bodies (C1, C2). Preferably, the method is performed using three bodies (C1, C2, C3) and two sealing materials (M1, M2).

However, there are still many types of pipeline leakages, which cannot be cured using the aforementioned prior art materials and methods. There thus remains an urgent need to develop systems and methods for curing pipeline leakages.

SUMMARY OF THE INVENTION

It is an object of some aspects of the present invention to provide methods of forming gel pigs for use in systems and methods for sealing pipeline leakages.

In preferred embodiments of the present invention, improved methods are provided for producing gel pigs.

In other embodiments of the present invention, a method and system are provided for sealing leaks in water transport pipelines.

There is thus provided according to an embodiment of the present invention, a method for curing at one leakage site in a pipeline, the method including
a. introducing a pig train into the pipeline, the pig train including;
   i) at least one gel pig including;
      a. a hygroscopic component in a concentration of 1-10% w/w;
      b. boric acid (0.1-1 M) a base in a concentration of 0.1-10%; and
      c. water in a concentration of 85-99.5% w/w;
   ii) at least one sealant composition including at least one of at least one of;
      i. a multiplicity of plugging devices including at least one resinous composition and at least one hardening composition; and
      ii. a multiplicity of fibers including at least one resinous composition and at least one hardening composition;
   wherein the at least one gel pig and the at least one sealant composition form the pig train;
b. enabling the pig train to move along the pipeline to a region of the at least one leakage and to cure the at least one leakage.

Additionally, according to an embodiment of the present invention, the at least one gel pig includes one gel pig and the at least one sealant composition includes one fiber-in-sealant composition.

Furthermore, according to an embodiment of the present invention, the at least one gel pig includes two gel pigs and the at least one sealant composition includes one fiber-in-sealant composition.

Further, according to an embodiment of the present invention, the pig train moves along the pipeline at a speed of 0.01 to 10 m/s.

Yet further, according to an embodiment of the present invention, the method further includes propelling a pressurized fluid from a first end of the pig train along the pipeline.

Additionally, according to an embodiment of the present invention, the pressurized fluid is at a pressure of 0.4-150 bar.

Furthermore, according to an embodiment of the present invention, the method further includes counter-pressurizing the pig train from a second end of the pipeline with a counter pressurized fluid.

Additionally, according to an embodiment of the present invention, the hygroscopic component includes hydroxypropyl guar gum.

Moreover, according to an embodiment of the present invention, the method further includes extracting the pig train from the pipeline via a conduit of less than two inch diameter at a pressure of less than 3 bar.

Additionally, according to an embodiment of the present invention, the pig train is launched from a pipe at a pressure in the range of 0.4-15 bar.

Importantly according to an embodiment of the present invention, the at one leakage includes at least two leakages and wherein the method is repeated until the at least two leakages are fully sealed and cured.

There is thus provided according to an embodiment of the present invention, a method for curing at one leakage site in a pipeline, the method including
a. introducing a pig train into the pipeline, the pig train including;
   i) at least one gel pig; and
   ii) at least one sealant composition; wherein the at least one gel pig and the at least one sealant composition form said pig train;
b. enabling the pig train to move along the pipeline to a region of the at least one leakage and to seal the at least one leakage.

Additionally, according to an embodiment of the present invention, the at least one gel pig includes one gel pig and the at least one sealant composition includes one sealant composition.

Moreover, according to an embodiment of the present invention, the at least one gel pig includes two gel pigs and the at least one sealant composition includes one sealant composition.

Further, according to an embodiment of the present invention, the at least one gel pig includes three gel pigs and the at least one sealant composition includes two sealant compositions.

Yet further, according to an embodiment of the present invention, the pig train moves along the pipeline at a speed of 0.01 to 10 m/s.

Furthermore, according to an embodiment of the present invention, the at least one gel pig includes one rear pig.

Additionally, according to an embodiment of the present invention, at least one of the two pigs has an average diameter of at least 5% less than an internal diameter of the pipeline.

Moreover, according to an embodiment of the present invention, at least one of the two pigs has an average diameter of at least 10% less than an internal diameter of the pipeline.

Importantly, according to an embodiment of the present invention, the at least one gel pig includes;
a. a cellulosic polysaccharide;
b. a surfactant; and
c. water.

Additionally, according to an embodiment of the present invention, the at least one gel pig further includes;
d. a filler; and
e. a metallic hydroxide.

According to another embodiment of the present invention, the at least one gel pig further includes an oil.

Moreover, according to an embodiment of the present invention, the at least one gel pig includes a rear pig and a front pig of different compositions.

Furthermore, according to an embodiment of the present invention, wherein the pig train conforms to an inner profile of the pipeline.

Additionally, according to an embodiment of the present invention, the inner profile of the pipeline is reduced in diameter in at least one section by at least 20%.

Further, according to an embodiment of the present invention, the inner profile of the pipeline is reduced in diameter in at least one section by at least 50%.

Yet further, according to an embodiment of the present invention, the inner profile of the pipeline is reduced in diameter in at least one section by at least 75%.

Additionally, according to an embodiment of the present invention, the inner profile of the pipeline is further increased in the diameter in at least one section by at least 20%.

Moreover, according to an embodiment of the present invention, the inner profile of the pipeline is increased in the diameter in at least one section by at least 50%.

Additionally, according to an embodiment of the present invention, the inner profile of the pipeline is increased in the diameter in at least one section by at least 75%.

Furthermore, according to an embodiment of the present invention, the method further includes propelling a pressurized fluid from a first end thereof along the pipeline.

Additionally, according to an embodiment of the present invention, the pressurized fluid includes a liquid.

Moreover, according to an embodiment of the present invention, the pressurized fluid includes a gas.

Further, according to an embodiment of the present invention, the pressurized fluid includes a tri-phase fluid.

Yet further, according to an embodiment of the present invention, the pressurized fluid is at a pressure of 0.1-150 bar.

Additionally, according to an embodiment of the present invention, the pig train prevents a bypass of a propelling product by of more than 30%.

Moreover, according to an embodiment of the present invention, the method further includes extracting the pig train from the pipeline via a conduit of less than two inch diameter at a pressure of less than 3 bar.

Furthermore, according to an embodiment of the present invention, the method further includes introducing or launching the pig train into the pipeline via a conduit of less than two inch diameter at a pressure of less than 5 bars.

Additionally, according to an embodiment of the present invention, the method further includes counter-pressurizing the pig train from a second end of the pipeline with a counter pressurized fluid.

Further, according to an embodiment of the present invention, the counter pressurized fluid is for controlling velocity of movement of the pig train along the pipeline.

Yet further, according to an embodiment of the present invention, the pig train is launched from a pipe of a diameter of less than 75% of the pipeline.

Additionally, according to an embodiment of the present invention, the pig train is launched from a pipe of a diameter of less than 50% of the pipeline.

In some cases, according to an embodiment of the present invention the pig train is launched from a pipe of a diameter of less than 75% of the pipeline.

Additionally, according to an embodiment of the present invention, the pig train is launched from a pipe at an angle of greater than 30° to the pipeline.

Furthermore, according to an embodiment of the present invention, the pig train is launched from a pipe at an angle of greater than 60° to the pipeline.

In some cases, according to an embodiment of the present invention, the pig train is launched from a pipe at an angle of greater than 80° to the pipeline.

Additionally, according to an embodiment of the present invention, the pig train is launched from a pipe at a pressure in the range of 0.2-15 bar.

Further, according to an embodiment of the present invention, the pig train is launched from a pipe at a pressure in the range of 2-5 bar.

Importantly, according to an embodiment of the present invention, the pig train travels through an obstruction in the pipeline and is operative thereafter.

Additionally, according to an embodiment of the present invention, the obstruction is selected from the group consisting of a butterfly valve, a wedge, a nail, a screw, an obstructing element, an in-pipe meter, a service pipe ferrule, an incrustation and a tuberculation, a baffle, a broomstick seal and combinations thereof.

The present invention provides systems and methods for curing a leakage in a pipeline, the system including at least one gel pig and at least one sealant composition; wherein the at least one gel pig and the at least one sealant composition form a pig train, adapted to move along the pipeline to a region of the leakage and to seal the leakage.

The present invention will be more fully understood from the following detailed description of the preferred embodiments thereof, taken together with the drawings.

BRIEF DESCRIPTION OF THE DRAWINGS

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1A is a simplified pictorial illustration showing a system for sealing a pipeline, in accordance with an embodiment of the present invention;

FIG. 1B is a simplified pictorial illustration showing another system for sealing a pipeline, in accordance with an embodiment of the present invention;

FIG. 1C is a simplified pictorial illustration showing another system for sealing a pipeline, in accordance with an embodiment of the present invention;

FIG. 1D is a simplified pictorial illustration showing another system for sealing a pipeline, in accordance with an embodiment of the present invention;

FIG. 2 is a simplified flow chart of a method for sealing a pipeline, in accordance with an embodiment of the present invention;

FIG. 3 is a simplified flow chart of another method for sealing a pipeline, in accordance with an embodiment of the present invention;

FIG. 4 is a simplified flow chart of another method for sealing a pipeline, in accordance with an embodiment of the present invention;

FIG. 5 is a simplified pictorial illustration showing a system for sealing a pipeline, in accordance with an embodiment of the present invention;

FIG. 6 is a simplified flow chart of another method for sealing and curing a pipeline, in accordance with an embodiment of the present invention; and FIG. 7 is a simplified pictorial illustration showing a system for sealing and curing a pipeline, in accordance with an embodiment of the present invention.

In all the figures similar reference numerals identify similar parts.

DETAILED DESCRIPTION OF THE EMBODIMENTS

In the detailed description, numerous specific details are set forth in order to provide a thorough understanding of the invention. However, it will be understood by those skilled in the art that these are specific embodiments and that the present invention may be practiced also in different ways that embody the characterizing features of the invention as described and claimed herein.

The pigs, sealant compositions, carrier fluid compositions and chips (also called plugs, plugging devices or sealant plugs) used in the present invention may be any described in the following patents/patent applications, incorporated herein by reference:— WO2008/081441, to Perstnev et al., WO2016042541A1, WO2016098093A1, WO2016-098094A1, WO2016098095A1, U.S. Pat. Nos. 9,045,648, 9,738,798B2, US20170299108A1, US20170363245A1 and US20180003330A1.

By "seal" or "sealing", is meant stopping flow from a leakage site, such as a crack or hole.

By "cure" or "curing" is meant permanently preventing flow from a leakage site, such as a crack or hole, for at least one month.

Figure 1A:
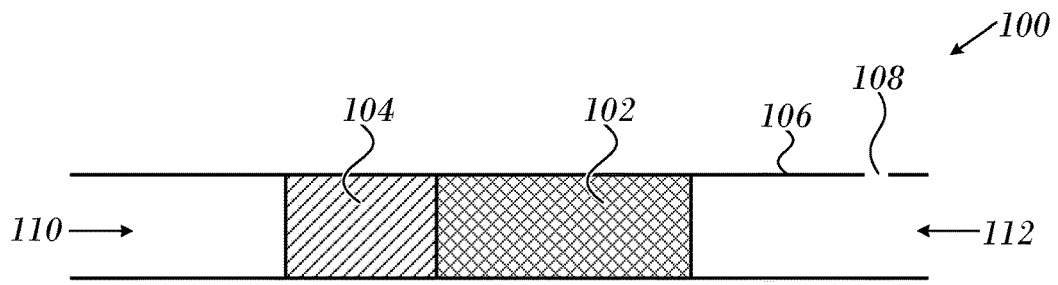

Reference is now made to FIG. 1A, which is a simplified pictorial illustration showing a system 100 for sealing a pipeline, in accordance with an embodiment of the present invention.

System 100 is constructed and configured to seal a pipeline 106 comprising at least one leakage site 108, such as a crack or hole. System 100 comprises a sealant composition 102 and a gel pig 104. System 100 is adapted to travel along the pipeline using a first pressure force 110 to the rear of the gel pig and a counter force 112 upstream (lesser than force 110). Some non-limiting examples of the gel pig compositions appear in the examples hereinbelow. Some non-limiting examples of the sealant compositions are disclosed in Israel Patent No. 180474.

Another non-limiting example of sealant composition 102 (also called fiber-in-sealant composition, herein) is:
a) fibers of different sizes;
b) at least one hardener;
c) at least one resin; and
d) water.

Additionally, according to an embodiment of the present invention, the at least one gel pig 104 includes;
a. a cellulosic polysaccharide;
b. an acid;
c. a base; and
d. water.

Additionally, according to an embodiment of the present invention, the at least one gel pig includes;
a. a cellulosic polysaccharide;
b. boric acid;
c. a base; and
d. water.

Additionally, according to an embodiment of the present invention, the at least one gel pig includes;
a. hydroxypropyl guar gum;
b. boric acid;
c. a base; and
d. water.
e. water.

Additionally, according to an embodiment of the present invention, the at least one gel pig includes;
a. hydroxypropyl guar gum;
b. boric acid;
c. sodium hydroxide; and
d. water.

Additionally, according to an embodiment of the present invention, the at least one gel pig includes;
a. 1-5% weight hydroxypropyl guar gum;
b. 0.1-6% weight boric acid;
c. 0.1-4% weight sodium hydroxide; and
d. 70-99.5% weight water.

Additionally, according to an embodiment of the present invention, the at least one gel pig includes;
a. 1-5% weight hydroxypropyl guar gum;
b. 0.1-6% weight boric acid;
c. 0.1-4% weight sodium hydroxide; and
d. 70-99.5% weight water.

A non-limiting example of composition 104 is:
a) At least one organic or inorganic filler selected from carbon ash, aluminum hydroxide, calcium carbonate, calcium hydroxide, magnesium hydroxide, magnesium carbonate, titanium hydroxide, silica, similar fillers and combinations thereof in a weight ratio of 0.01-3% wt/wt.
b) At least one gelling agent selected from carrageenan, agar agar, hydroxymethylcelluose, hydroxyethyl cellulose, hydroxypropyl cellulose and combinations thereof in a weight ratio of 0 to 20% wt/wt.
c) A coloring agent selected from a water soluble dye, a water insoluble dye, a paint, an oxide, a metal oxide and combinations thereof in a weight ratio of 0 to 1% wt/wt.
d) At least one surfactant selected from an ionic surfactant, an anionic surfactant, a detergent, an edible oil, an inedible oil and combinations thereof in a weight ratio of 0.01 to 10% wt/wt.
e) At least one aqueous agent selected from sea water, tap water, distilled water, ice and combinations thereof in a weight ratio of 20 to 90% wt/wt.
f) Another non-limiting example of a gel pig composition is in accordance with the composition in Table 1 below:

TABLE 1

Exemplary composition of a front or rear gel pig

| Constituent | Constituent wt/wt % | CAS Numbers | Concentration |
|---|---|---|---|
| Hydroxypropyl Guar Gum | 1.5-5% | 39421-75-5 | — |
| Sodium hydroxide | 0.1-4% | 1310-73-2 | 0.1M (0.4% NaOH and 99.6% water) |

TABLE 1-continued

Exemplary composition of a front or rear gel pig

| Constituent | Constituent wt/wt % | CAS Numbers | Concentration |
|---|---|---|---|
| Boric Acid | 1-4% | 10043-35-3 | 0.59M (boric acid = 3.65% w/w, water 96.65% w/w) |
| Water | 90-97%% | — | |
| | 100% | | |

Figure 1B:
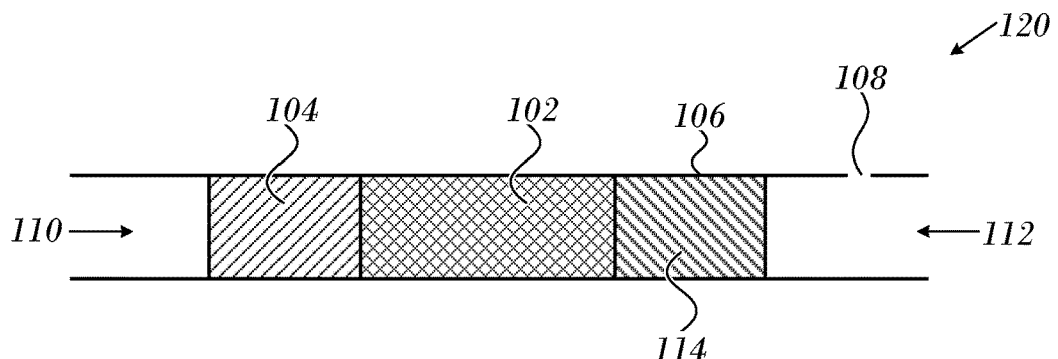

FIG. 1B shows a simplified pictorial illustration showing another system 120 for sealing a pipeline, in accordance with an embodiment of the present invention. System 120 comprises two gel pigs 104, 106. These gel pigs may be of identical or different compositions. These are termed herein a rear gel pig 104 and a front gel pig 106. Dispersed between the two gel pigs is sealant composition 102. Some non-limiting examples of the gel pig compositions appear in the examples hereinbelow. Some non-limiting examples of the sealant compositions are disclosed in Israel Patent No. 180474.

Figure 1C:
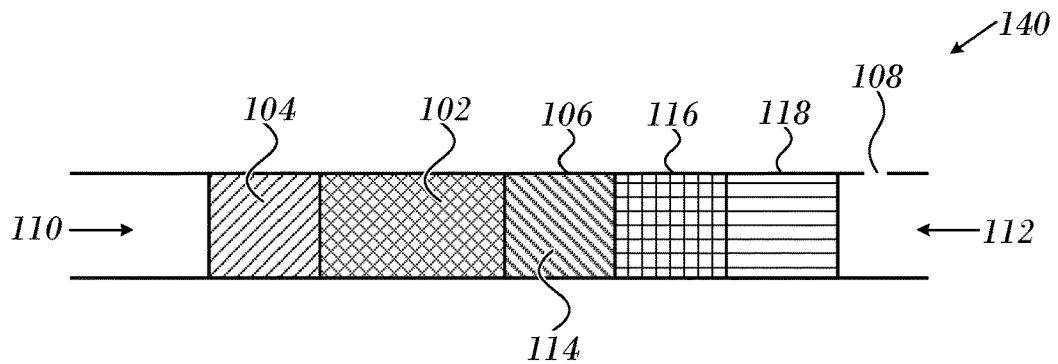

There can be seen in FIG. 1C a simplified pictorial illustration showing another system 140 for sealing a pipeline, in accordance with an embodiment of the present invention. System 140 comprises three gel pigs 104, 114, 118 and two sealant compositions 102, 116. These gel pigs may be of identical or different compositions. Likewise, sealant compositions 102, 116 may be identical or different. Some non-limiting examples of the gel pig compositions appear in the examples hereinbelow. Some non-limiting examples of the sealant compositions are disclosed in Israel Patent No. 180474.

A non-limiting example of composition 114 is:
a) At least one organic or inorganic filler selected from carbon ash, aluminum hydroxide, calcium carbonate, calcium hydroxide, magnesium hydroxide, magnesium carbonate, titanium hydroxide, silica, similar fillers and combinations thereof in a weight ratio of 0.01-10% wt/wt.
b) At least one gelling agent selected from carrageenan, agar agar, hydroxymethylcelluose, hydroxyethyl cellulose, hydroxypropyl cellulose and combinations thereof in a weight ratio of 0 to 30% wt/wt.
c) A coloring agent selected from a water soluble dye, a water insoluble dye, a paint, an oxide, a metal oxide and combinations thereof in a weight ratio of 0 to 1% wt/wt.
d) At least one surfactant selected from an ionic surfactant, an anionic surfactant, a detergent, an edible oil, an inedible oil and combinations thereof in a weight ratio of 0.01 to 20% wt/wt.
e) At least one aqueous agent selected from sea water, tap water, distilled water, ice and combinations thereof in a weight ratio of 20 to 85% wt/wt.

A non-limiting example of composition 118 is:
a) At least one organic or inorganic filler selected from carbon ash, aluminum hydroxide, calcium carbonate, calcium hydroxide, magnesium hydroxide, magnesium carbonate, titanium hydroxide, silica, similar fillers and combinations thereof in a weight ratio of 0.01-10% wt/wt.
b) At least one gelling agent selected from carrageenan, agar agar, hydroxymethylcelluose, hydroxyethyl cellulose, hydroxypropyl cellulose and combinations thereof in a weight ratio of 0 to 30% wt/wt.
c) A coloring agent selected from a water soluble dye, a water insoluble dye, a paint, an oxide, a metal oxide and combinations thereof in a weight ratio of 0 to 1% wt/wt.
d) At least one surfactant selected from an ionic surfactant, an anionic surfactant, a detergent, an edible oil, an inedible oil and combinations thereof in a weight ratio of 0.01 to 20% wt/wt.
e) At least one aqueous agent selected from sea water, tap water, distilled water, ice and combinations thereof in a weight ratio of 20 to 85% wt/wt.

Figure 1D:
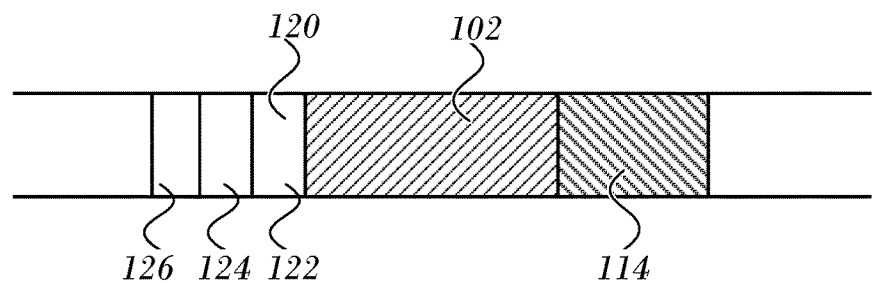

FIG. 1D is a simplified pictorial illustration showing another method 160 for sealing a pipeline, in accordance with an embodiment of the present invention. Method 160 comprises two gel pigs 114, 170 and a sealant composition 102 or 116 disposed therebetween. The front gel pig 114 may be similar or identical to those described herein. The rear gel pig 170 comprises at least two or three different compositions 122, 124, 126, for introduction into a pipeline sequentially (first 122, then 124 and thereafter 126).

Additionally or alternatively, the rear gel pig comprises four compositions, five compositions, six compositions, seven compositions, eight compositions or another multiplicity of compositions. A fourth composition 128 (not shown), a fifth composition 130 (not shown), a sixth composition 132 (not shown).

Additionally or alternatively, the rear gel pig comprises four compositions, five compositions, six compositions, seven compositions, eight compositions or another multiplicity of compositions. A fourth composition 128 (not shown), a fifth composition 130 (not shown), a sixth composition 132 (not shown).

When six compositions are applied, the first composition (front to back) serves as a separator between the sealing composition and the second composition. It has a density of 1.0-1.5 g/cm$^3$. The second composition, together with the third composition, forms a two (horizontal) layer sealant body preventing or minimizing bypass of the liquid propellant. The second composition has a density of 0.9-1.5 g/cm$^3$ and the third composition has a density of 0.8-1.2 g/cm$^3$. The fourth and fifth compositions isolate the third composition from the liquid propellant. Respective densities are 1.0-1.8 g/cm$^3$ and 0.8-1.2 g/cm$^3$. The sixth composition is a gel sealant, whose purpose is to temporarily seal the pig train from the rear upon launch. It has a density of 0.8-1.2 g/cm$^3$.

Figure 2:
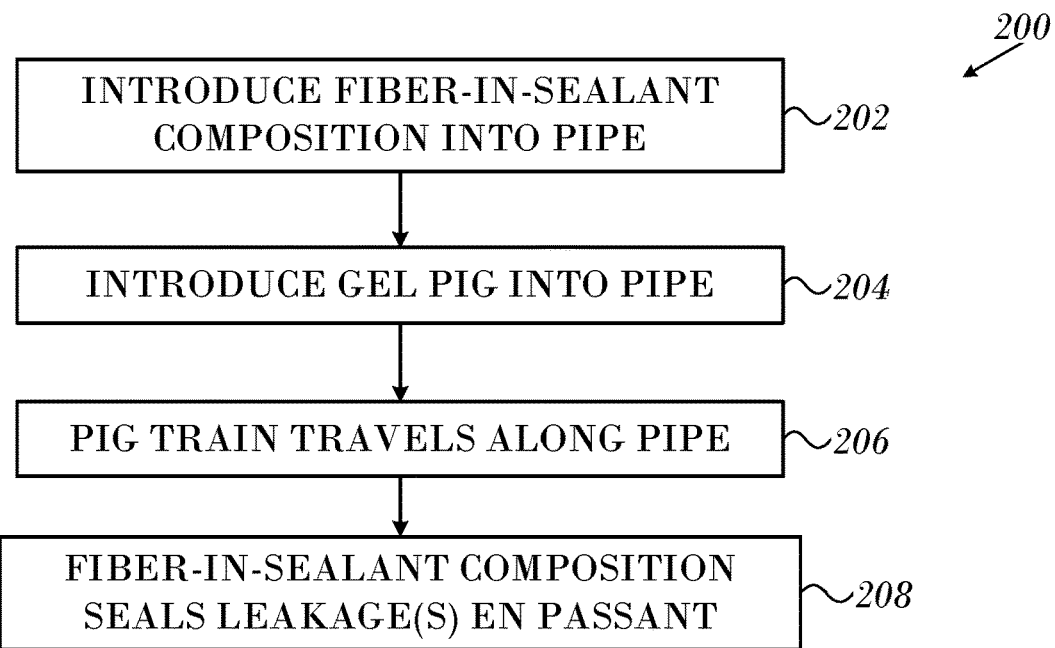

Reference is now made to FIG. 2, which is a simplified flow chart of a method 200 for sealing a pipeline, in accordance with an embodiment of the present invention, with reference to FIG. 1A. A sealant composition, such as a fiber-in-sealant composition 708 (FIG. 7) is introduced to pipeline 106 in a sealant composition introducing step 202. This may be performed from one end of the pipe, from a fire hydrant, from a manhole, vertical, lateral pipe, communication pipe or branch pipe.

A non-limiting example of the fiber-in-sealant composition appears in Table 2 herein below.

TABLE 2

Example of Fiber-in-Sealant composition 708

| Component | Weight percent range |
|---|---|
| Composition A (see table 3) | 0.5-4 |
| Composition B (see table 4) | 1-7 |
| Cut fibers | 0.5-5 |
| Silica | 1-6 |
| Carrier fluid (table 5) | 85-98 |
| total | 100 |

TABLE 3 ingredients in composition A

| | WEIGHT PERCENT % | CAS NO. |
|---|---|---|
| Diethylenetriamine | 10-50 | 1140-40-0 |
| Bisphenol A | 10-30 | 80-05-7 |
| Isophorondiamine | 20-40 | 2855-13-2 |
| Benzyl alcohol | 20-50 | 100-51-6 |
| TOTAL | 100 | |

TABLE 4 ingredients in composition B

| | WEIGHT PERCENT % | CAS NO. |
|---|---|---|
| Phenol-Formaldehyde Polymer Glycidyl Ether | 0-20 | 35068-38-6 |
| Alkyl (C12-C14) glycidyl ether) | 5-15 | 68609-97-2 |
| YD-128 | 50-96% | 25068-38-6 |
| Dynaslan glymo | 0-1 | 2530-83-8 |
| Byk 066 | 0-4 | 108-83-8 |
| TOTAL | 100 | |

A non-limiting example of the carrier fluid composition appears in Table 5 hereinbelow.

TABLE 5

Example of a carrier fluid composition.

| Component | Weight percent range | CAS NUMBER(S) |
|---|---|---|
| Pyrogenic silica | 0-3% | 112945-52-5 |
| Synthetic aluminum hydroxide | 0-3% | 21645-51-2 |
| Hydroxyethyl cellulose | 0.1-5% | 9004-62-0, 127-09-3, 9004-34-6, 107-22-2 |
| Vegetable oil | 5-30% | 120962-03-0 |
| water | 20-99% | |
| total | 100% | |

Thereafter, gel pig 104 is introduced from the same end of the pipe as the sealant composition or from a manhole or vertical, in a gel pig composition introducing step 202.

The combination of the sealant composition 102 and gel pig 104 is termed herein a "pig train". The pig train travels along the pipe in a travelling step 206 to site 108 of the leakage. The fiber-in-sealant composition is operative to seal the leakage in a sealing step 208. It typically takes a few minutes to several hours until the seal is fully cured.

Typically, gel pig 104 or any of the other gel pigs described herein is of approximately the same diameter as the inner diameter of the pipe and is typically 0.5-10 diameters in length. The physical properties of the gel pig appear in Table 8.

Figure 3:
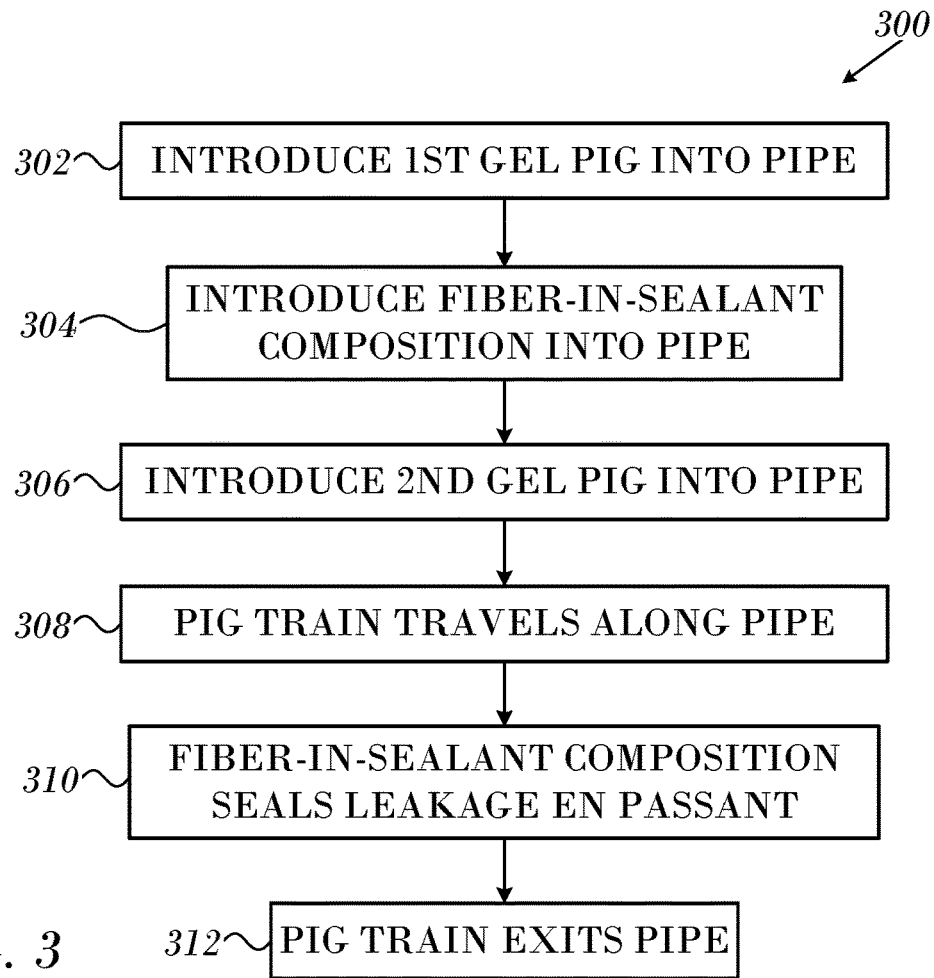

Reference is now made to FIG. 3, which is a simplified flow chart of another method 300 for sealing a pipeline, in accordance with an embodiment of the present invention, with reference to FIG. 1.

A first gel pig 114 is introduced to the pipe from a fire hydrant, from a manhole, vertical, lateral pipe, communication pipe or from a branch pipe in an introducing pig step 302.

A fiber-in-sealant composition, such as fiber-in-sealant composition 708 is introduced to pipeline 106 in a sealant composition introducing step 304. This may be performed from one end of the pipe or from a manhole or vertical.

Thereafter, an optional second gel pig 104 is introduced from the same end of the pipe as the sealant composition or from a manhole or vertical, in a second gel pig composition introducing step 306.

The combination of the fiber-in-sealant composition 708 or sealant composition 102 and gel pigs 114, 104 or any of the other gel pigs described herein, is termed herein a "pig train". The pig train travels along the pipe in a travelling step 308 to site 108 of the leakage. The fiber-in-sealant composition 708 and/or sealant composition 102 is operative to seal the leakage in a sealing step 310. It typically takes a few minutes to several hours until the seal is fully cured.

Typically, gel pigs 104, 114 are of approximately the same diameter as the inner diameter of the pipe and is typically 0.5-10 diameters in length. The physical properties of the front gel pig 114 appear in Table 8-95.

The pig train is typically recovered from the pipeline in an exit pipe step 312.

Figure 4:
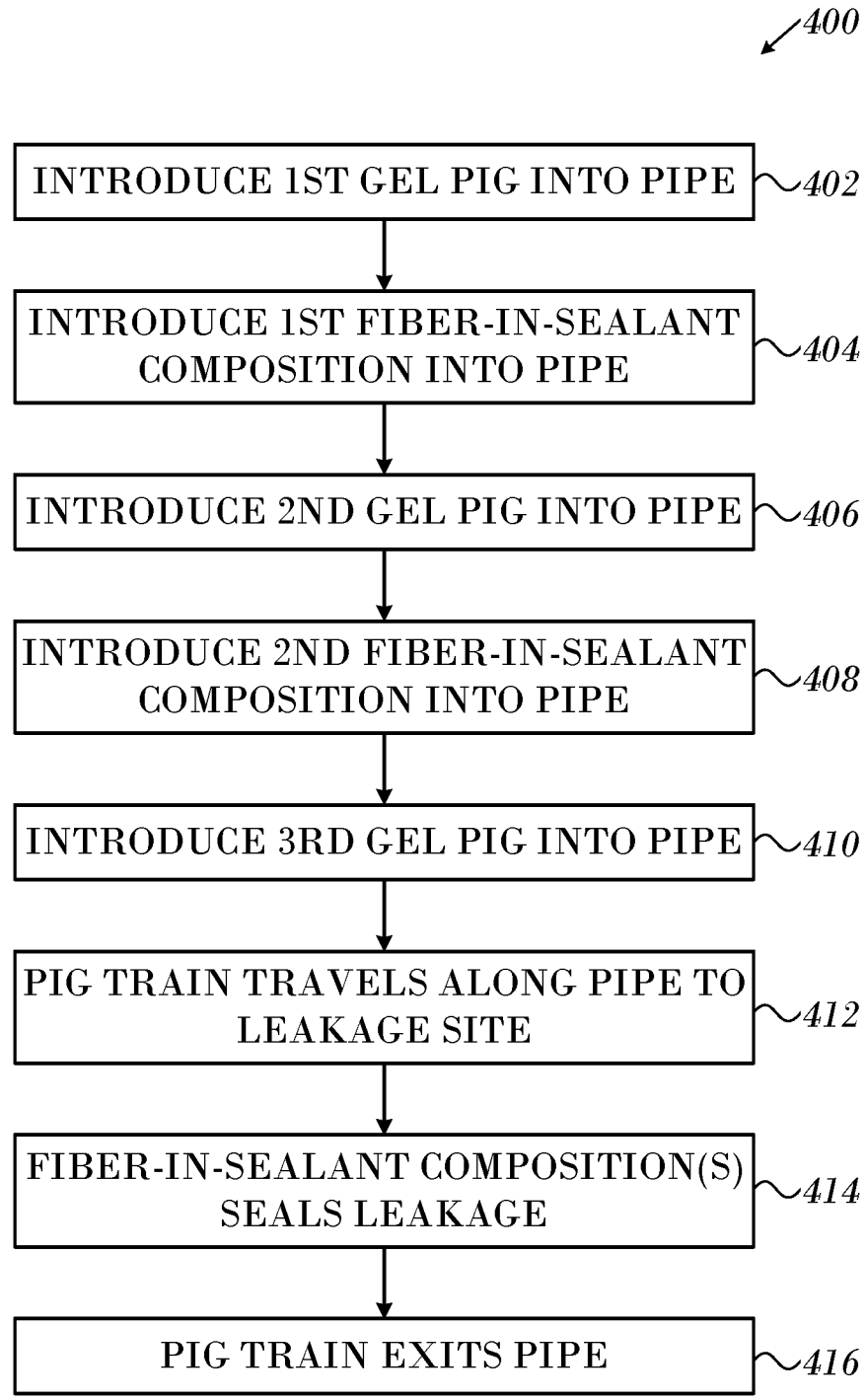

FIG. 4 is a simplified flow chart of another method 400 for sealing a pipeline, in accordance with an embodiment of the present invention, with reference to FIG. 1C.

A first gel pig 118 is introduced to the pipe from a fire hydrant, from a manhole, vertical, lateral pipe, communication pipe or from a branch pipe in a first introducing pig step 402.

A fiber-in-sealant composition, such as fiber-in-sealant composition 708 or sealant composition 116 is introduced to pipeline 106 in a first fiber-in-sealant composition introducing step 404. This may be performed from one end of the pipe or from a manhole or vertical.

Thereafter, a second gel pig 114 is introduced from the same end of the pipe as the first sealant composition or from a manhole or vertical, in a second gel pig composition introducing step 406.

A second fiber-in-sealant composition, such as sealant composition 708 is introduced to pipeline 106 in a second fiber-in-sealant composition introducing step 408. This may be performed from one end of the pipe or from a manhole or vertical.

Thereafter, a third gel pig 104 is introduced from the same end of the pipe as the first and second sealant composition or from a manhole or vertical, in a third gel pig composition introducing step 410.

The combination of the fiber-in-sealants compositions 708, 708 or sealant compositions 102, 116 and gel pigs 118, 114 and 104 is termed herein a "pig train". The pig train travels along the pipe in a travelling step 412 to site 108 of the leakage. The fiber-in-sealant composition(s) and/or sealant compositions 102, 116 is/are operative to seal the leakage in a sealing step 414. It typically takes a few minutes to several hours until the seal is fully cured.

Typically, gel pigs 104, 114, 118 are of approximately the same diameter as the inner diameter of the pipe and is typically 0.5-10 diameters in length. The physical properties of the front/middle gel pig 118/114 appear in Table 9.

The pig train is typically recovered from the pipeline in an exit pipe step 416. In some cases, one or more of the gel pigs may be replaced with a polymer pig, such as polyurethane.

Figure 5:
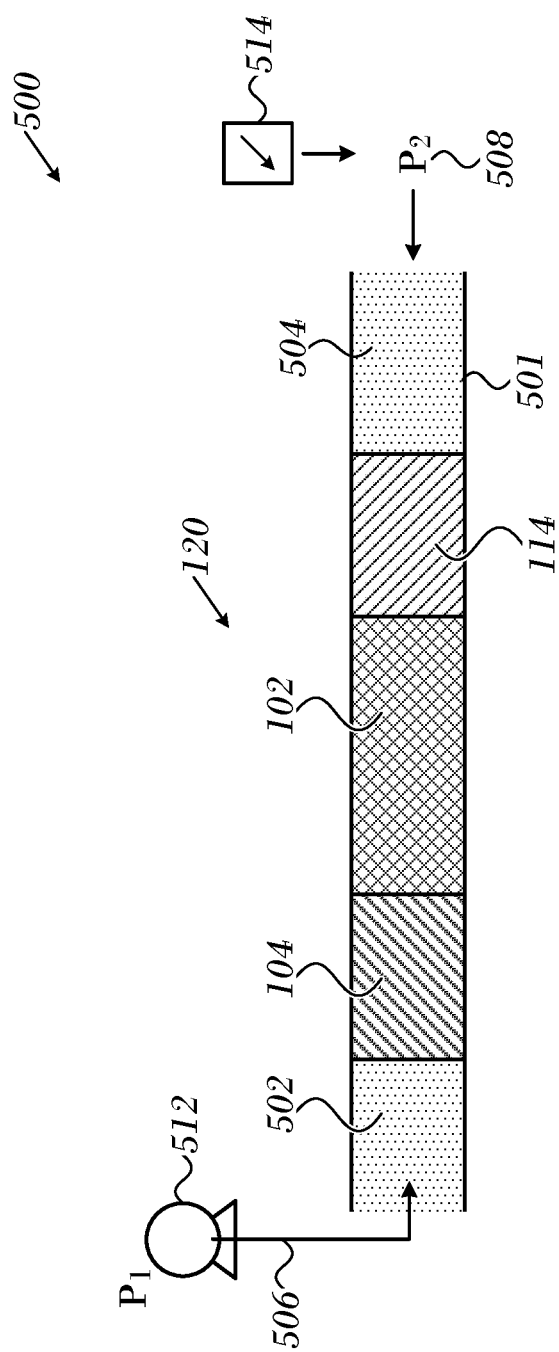

Reference is now made to FIG. 5, which is a simplified pictorial illustration showing a system 500 for sealing a pipeline, in accordance with an embodiment of the present invention.

System 500 comprises a front gel pig 114 and a real gel pig 104. A sealant composition 102 is disposed between pigs 114 and 104, forming a pig train 120. A fluid 502 is inserted to a pipeline 501 and a first pressure $P_1$ 506 is applied to fluid 502. Additionally a second counter-pressure $P_2$, 508 is applied to a second fluid 504. Typically $P_1$ is greater than $P_2$. The average velocity of pig train 120 is determined by the fluid properties, the smoothness of the pipe interior and a pressure difference $(P_1-P_2)$.

Pressure P1 is introduced by a pump 512, pressure from an existing network or any other suitable pressure introducing means, known in the art. The pressure P1 is typically regulated by control means, as are known in the art.

Pressure P2 may be introduced by any suitable passive means, such as a pressure relief valve 514, a discharge valve, a pressure regulator or the like.

The gel pigs of the present invention provide the following advantages:—

1) Gel pigs are adapted to multi-dimensioned pipes-adaption to variable and changing diameters in situ.
2) Non-abrasive very non-abrasive (in contrast to poly pigs, which may get stuck in a pipeline, induce a reddening of water, induce a change of pH of the water, or may abrade tubicles).
3) Gel pigs of the present invention are to introduce into pipe and to remove from pips providing system flexibility.
4) Gel pigs of the present invention do not normally get stuck in the pipe (better than polymer (solid) pigs) and due to their fluidity, can always be flushed out.
5) The rear pig does not compromise/dislodge/disengage newly formed seals, in contrast to solid pigs.
6) Gel pigs of the present invention are fully flushable (in contrast solid pigs leave debris).
7) A front pig of the present invention allows water to bypass and overtake-allows escape route to prevent/minimize sealant composition dilution.
8) In a two pig system, the rear pig acts differently to the front pig.
9) Pig receiver/retriever for solid pigs is not required for gel pigs.
10) The gel pigs of the present invention are biodegradable.
11) Gel pigs of the present invention require reduced transportation costs—here can be formulated at/near the site of use. This saves on transport costs.

EXAMPLES

Example 1

A gel pig is formed according to the following method.
1) Chemical constituents were obtained in accordance with tables 1, 6 or 7.
2) A gel pig mixture was made by mixing the components of table 1, 6 or 7 in a stirred vessel for several (1-30) minutes at ambient temperature and pressure.
3) The resultant gel formed was stored in a closed container in the dark for 0-60 days at room temperature before use.

TABLE 6

Chemical composition of gel pig

| Functional Component | Example Constituent | Weight percent [%] |
|---|---|---|
| Hygroscopic component | Cellulose, gum, gelatin or other | 1-10 |
| surfactant | Oil or other | 0-8 |
| Base | Aluminum hydroxide | 0-20 |
| Cross-linker | Boric acid | 0-5% |
| Particulate | Silica | 0-2 |
| Carrier fluid | Water | 70-95 |
| Total | | 100 |

Another non-limiting example of composition of a gel pig is in accordance with the composition in the table below:

TABLE 7

Exemplary composition of a front or rear gel pig

| Constituent | Constituent % Range weight % | CAS Numbers | Molarity |
|---|---|---|---|
| Hydroxypropyl Guar Gum | 1-5 | 39421-75-5 | — |
| Sodium hydroxide | 0.1-4 | 1310-73-2 | 0.4% w/w |
| Boric Acid | 0.1-6 | 10043-35-3 | 0.2-2 molar weight = 3.65% w/w |
| Water | 70-99.5 | | — |
| | 100% | | |

According to some embodiments, the physical properties of the gel pigs appear as in tables 8 and/or 9.

According to one or more embodiments, hydrophobic solvents are liquid oils originating from vegetable, marine or animal sources. The canola oil exemplified may be replaced by any suitable liquid oil including saturated, unsaturated or polyunsaturated oils. By way of example, the unsaturated oil may be olive oil, corn oil, soybean oil, cottonseed oil, coconut oil, sesame oil, sunflower oil, borage seed oil, syzigium aromaticum oil, hempseed oil, herring oil, cod-liver oil, canola oil, salmon oil, flaxseed oil, wheat germ oil, evening primrose oils or mixtures thereof, in any proportion.

According to one or more embodiments, the silica exemplified may be replaced by a) microsponges, b) silica, c) mineral bodies like zeolite, bentonite, (iii) graphite, including polymers, dendrimers and liposomes, or mixtures thereof, in any proportion.

According to one or more embodiments, the aluminum hydroxide exemplified may be replaced by minerals such as aluminum phosphate and calcium phosphate or mixtures thereof, in any proportion.

According to one or more embodiments, the hydroxyethyl cellulose exemplified may be replaced by any at least one polymeric additive selected from the group consisting of polysaccharides, natural polysaccharides, derivatives thereof, modified poysacharides, derivatives thereof, starch, dextrin, glycogen, cellulose and chitin, glycosaminoglycans (GAG's), chondroitin sulphate, dermatan sulphate, keratan sulphate, heparan sulphate, heparin, and hyaluronan, amylose and amylopectine, cellulose derivatives, xanthan gum, sodium CMC, methylcellulose, and hydroxyl propyl methyl cellulose or mixtures thereof, in any proportion.

Specific non limiting examples of surfactants are an ionic surfactant, a non-ionic surfactant, a hydrophobic surfactant or mixtures thereof, in any proportion.

Exemplary hygroscopic agents that can be used in accordance with one or more embodiments include, for example, naturally-occurring polymeric materials, such as locust bean gum, sodium alginate, sodium caseinate, egg albumin, gelatin agar, carrageenan gum, sodium alginate, xanthan gum, quince seed extract, tragacanth gum, guar gum, starch, chemically modified starches and the like, semi-synthetic polymeric materials such as cellulose ethers (e.g. hydroxyethyl cellulose, methyl cellulose, carboxymethyl cellulose, hydroxy propylmethyl cellulose), guar gum, hydroxypropyl guar gum, soluble starch, cationic celluloses, cationic guars, and the like, and synthetic polymeric materials, such as carboxyvinyl polymers, polyvinylpyrrolidone, polyvinyl alcohol, polyacrylic acid polymers, polymethacrylic acid polymers, polyvinyl acetate polymers, polyvinyl chloride polymers, polyvinylidene chloride polymers and the like. Mixtures of the above compounds are contemplated.

According to some further embodiments, a base may be selected from sodium hydroxide, magnesium hydroxide, aluminum hydroxide, potassium hydroxide and combinations thereof.

TABLE 8

Physical and Chemical properties of rear gel pig

| | minimum | maximum |
|---|---|---|
| Viscosity cPs | 5 | 10000 |
| Density g/cm$^3$ | 0.8 | 1.2 |

TABLE 9

Physical and Chemical properties of front gel pig

| | minimum | maximum |
|---|---|---|
| Viscosity cPs | 5 | 10000 |
| Density g/cm$^3$ | 0.8 | 1.5 |

A non-limiting example of a carrier fluid composition 601 is provided in Table hereinbelow.

TABLE 10

Example of a carrier fluid composition.

| Component | Weight percent range | CAS NUMBER(S) |
|---|---|---|
| Pyrogenic silica | 0-3% | 112945-52-5 |
| Synthetic aluminum hydroxide | 0-3% | 21645-51-2 |
| Hydroxyethyl cellulose | 0.1-5% | 9004-62-0, 127-09-3, 9004-34-6, 107-22-2 |

TABLE 10-continued

Example of a carrier fluid composition.

| Component | Weight percent range | CAS NUMBER(S) |
|---|---|---|
| Vegetable oil | 5-30% | 120962-03-0 |
| water | 20-99% | |

The ground silica formulation comprises cristobalite (CAS Number 4808-60-7), Aluminum oxide CAS Number: 1344-28-1, 5 Iron(III) oxide 1309-37-1 and Titanium(IV) oxide, anatase 1317-70-0).

Figure 6:
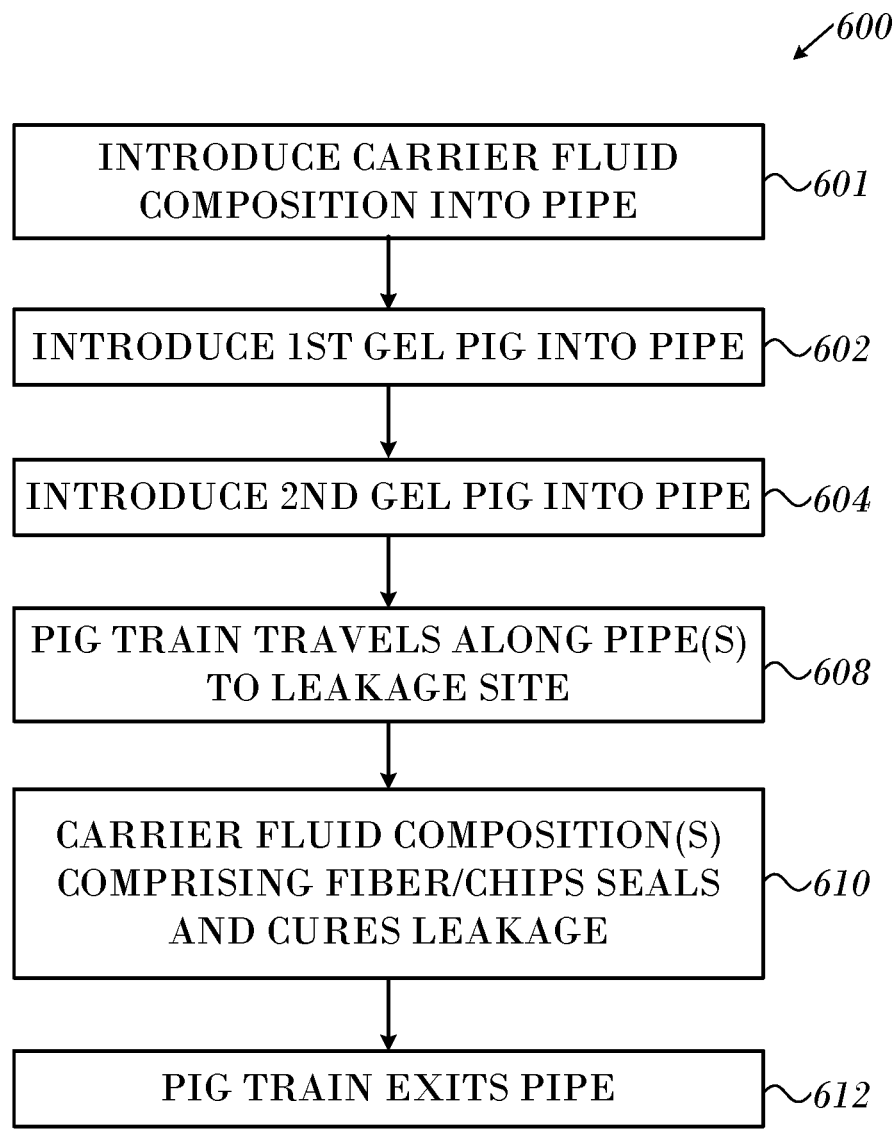
Figure 7:
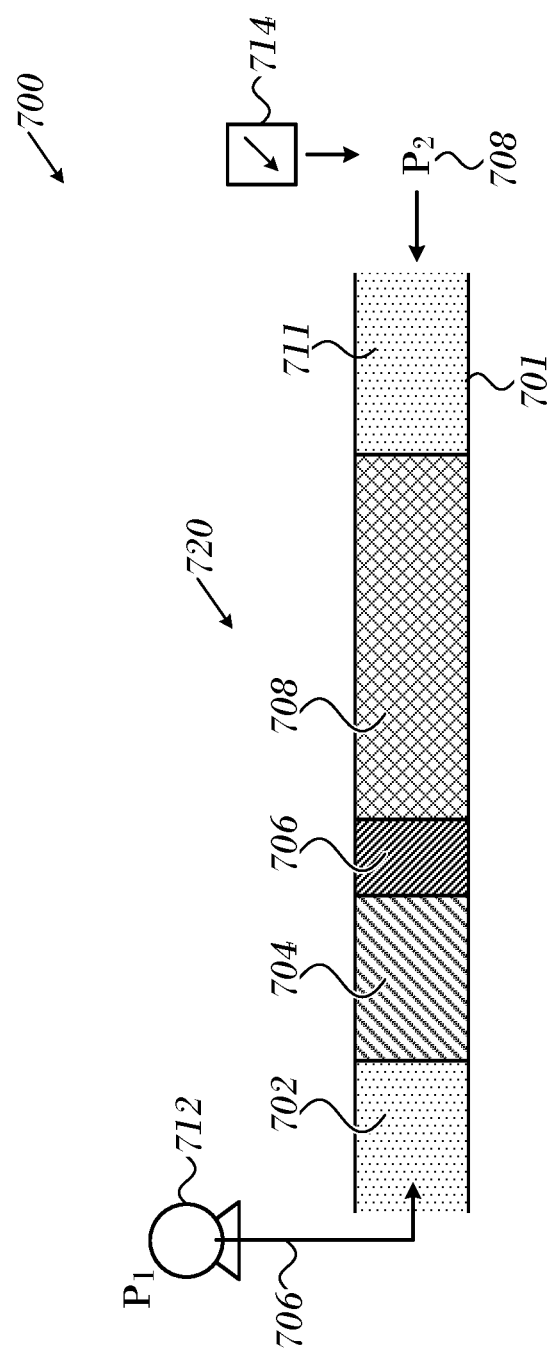

Reference is now made to FIG. 6, which is a simplified flow chart of another method 600 for sealing and curing a pipeline, in accordance with an embodiment of the present invention (taken together with FIG. 7).

A carrier fluid composition 708 (FIG. 7) is introduced to pipeline 701 in a carrier fluid introducing step 601. The carrier fluid composition may comprise fibers (termed herein fiber-in-sealant composition, as is described herein, per table 2) and/or loaded chips. This may be performed from one end of the pipe, from a fire hydrant, from a manhole, vertical, lateral pipe, communication pipe or branch pipe.

Thereafter, a first gel pig 706 is introduced from the same end of the pipe as the carrier composition or from a manhole or vertical, in a gel pig composition introducing step 602.

Thereafter, another gel pig 704 (FIG. 7) is introduced from the same end of the pipe as the carrier composition or from a manhole or vertical, in a second gel pig composition introducing step 604.

The combination of the carrier fluid composition/fiber-in-sealant composition 708 and one or more gel pigs 706, 704 is termed herein a "pig train". The pig train travels along the pipe in a travelling step 608 to site of the leakage. The carrier fluid 708 comprises either fibers or loaded chips, is operative to seal and cure the leakage in a sealing and curing step 610. It typically takes a few minutes to several hours until the seal is fully cured by the fibers or loaded chips.

The natural fibers may comprise fibers of a plant, animal, mineral, petrochemical origin and combinations thereof.

The fibers collected from the seeds of various plants are known as seed fibers. Fibers collected from the cells of a leaf are known as leaf fibers, such as ex.-pina, banana, etc.

Bast fibers are collected from the outer cell layers of the plant's stem. These fibers are used for durable yarn, fabric, packaging, and paper. Some examples are flax, jute, kenaf, industrial hemp, ramie, rattan and vine fibers.

For example, the hemp fiber used may comprise one or more of the following: NM8.5/1 (count 8.5 with 1 ply), NM8.5/3 (count 8.5 with 3 ply) and NM8.5/5 (count 8.5 with 5 ply) 100% hemp long fiber yarn ringspun/OE Bleached. Eco-Friendly, Anti-Bacteria, Anti-UV and Moisture-Absorbent.

Fibers collected from the fruit of the plant, e.g. coconut fiber (coir) bers from the stalks of plants, e.g. straws of wheat, rice, barley, bamboo and straw.

Plant fibers are rich in cellulose and they are a cheap, easily renewable source of fibers with the potential for polymer reinforcement. The presence of surface impurities and the large amount of hydroxyl groups make plant fibers less attractive for reinforcement of polymeric materials. Hemp, sisal, jute, and kapok fibers were subjected to alkalization by using sodium hydroxide.

The nanofibers are bundles of cellulose fibers of widths ranging between 30 and 100 nm and estimated lengths of several micrometers. The chemical analysis showed that selective chemical treatments increased the α-cellulose content of hemp nanofibers from 75 to 94%.

Natural fibers may include one or more of hemp, jute, flax cotton, soft wood, Ramie, Sisal and Bamboo.

Typically, the natural fibers are received as a long yarn. The long yarn may be one-ply, two-ply, three-ply, four-ply or any number of ply or combinations thereof. The long yarn are cut in a cutting step to be of easily manageable dimensions. For example, 8.5 mm and 1-ply. The cut fibers may be stored in a storing step before use.

In one non-limiting example, hemp yarn has a size of Nm 10 (Nm 10 yarn=10,000 meters per kilogram, or about 4,960 yards per pound) from single to multiple plies of 2, 3, 6 and 12 in either natural or bleached (using peroxide) Made from earth-friendly wet spun hemp, these yarns are smooth and durable The yarns may be provided on spools or in packages and may be single-ply, 2-ply, 3-ply, 5-ply, 6-ply and 12-ply or combinations thereof. In some cases, the following types are used: NM8.5/1 (count 8.5 with 1 ply), NM8.5/3 (count 8.5 with 3 ply) and NM8.5/5 (count 8.5 with 5 ply) 100% hemp long fiber yarn ringspun/or bleached. eco-friendly, anti-bacterial, anti-UV and moisture-absorbent.

The chips of the present invention may be those disclosed in US20170363244A1, for example, incorporated herein by reference.

Typically, gel pig 706, 704 any of the other gel pigs described herein is of approximately the same diameter as the inner diameter of the pipe and is typically 0.5-10 diameters in length.

The pig train is typically recovered from the pipeline in an exit pipe step 612.

Reference is now made to FIG. 7, which is a simplified pictorial illustration showing a system 700 for sealing and curing a pipeline, in accordance with an embodiment of the present invention.

System 700 comprises a first rear pig 706 and a second real gel pig 704. A carrier fluid composition 708 (such as, but not limited to fiber-in-sealant composition, table 2) is disposed in front of the two rear gel pigs, 706, 704, forming a pig train 720. A fluid 702 is inserted to a pipeline 701 and a first pressure $P_1$ 706 is applied to fluid 702. Additionally a second counter-pressure $P_2$, 708 is applied to a second fluid 711. Typically $P_1$ is greater than $P_2$. The average velocity of pig train 720 is determined by the fluid properties, the smoothness of the pipe interior and a pressure difference ($P_1$—$P_2$).

Pressure P1 is introduced by a pump 712, pressure from an existing network or any other suitable pressure introducing means, known in the art. The pressure P1 is typically regulated by control means, as are known in the art.

Pressure P2 may be introduced by any suitable passive means, such as a pressure relief valve 714, a discharge valve, a pressure regulator or the like.

The references cited herein teach many principles that are applicable to the present invention. Therefore the full contents of these publications are incorporated by reference herein where appropriate for teachings of additional or alternative details, features and/or technical background.

It is to be understood that the invention is not limited in its application to the details set forth in the description contained herein or illustrated in the drawings. The invention is capable of other embodiments and of being practiced and carried out in various ways. Those skilled in the art will readily appreciate that various modifications and changes can be applied to the embodiments of the invention as hereinbefore described without departing from its scope, defined in and by the appended claims.

The invention claimed is:

1. A method for curing at one leakage site in a pipeline, the method comprising
 a. introducing a pig train into the pipeline, the pig train comprising:
  i) at least one gel pig comprising:
   a. a hygroscopic component in a concentration of 1-10% w/w;
   b. boric acid (0.1-1 M) a base in a concentration of 0.1-10%; and
   c. water in a concentration of 85-99.5% w/w;
  ii) at least one sealant composition comprising at least one of:
   i. a multiplicity of plugging devices comprising at least one resinous composition and at least one hardening composition; and
   ii. a multiplicity of fibers comprising at least one resinous composition and at least one hardening composition;
 wherein said at least one gel pig and said at least one sealant composition form said pig train;
 b. enabling said pig train to move along said pipeline to a region of said at least one leakage and to cure said at least one leakage.

2. A method according to claim 1, wherein said at least one gel pig comprises one gel pig and said at least one sealant composition comprises one fiber-in-sealant composition.

3. A method according to claim 1, wherein said at least one gel pig comprises two gel pigs and said at least one sealant composition comprises one fiber-in-sealant composition.

4. A method according to claim 1, wherein said pig train moves along said pipeline at a speed of 0.01 to 10 m/s.

5. A method according to claim 1, further comprising propelling a pressurized fluid from a first end of said pig train along said pipeline.

6. A method according to claim 5, wherein said pressurized fluid is at a pressure of 0.4-150 bar.

7. A method according to claim 6, further comprising counter-pressurizing said pig train from a second end of said pipeline with a counter pressurized fluid.

8. A method according to claim 1, wherein said hygroscopic component comprises hydroxypropyl guar gum.

9. A method according to claim 1, further comprising extracting said pig train from said pipeline via a conduit of less than two inch diameter at a pressure of less than 3 bar.

10. A method according to claim 9, wherein said at one leakage comprises at least two leakages and wherein said method is repeated until said at least two leakages are fully sealed and cured.

11. A method according to claim 1, wherein said pig train is launched from a pipe of a diameter of less than 75% of said pipeline.

12. A method according to claim 11, wherein said pig train is launched from a pipe of a diameter of less than 50% of said pipeline.

13. A method according to claim 11, wherein said pig train is launched from a pipe at an angle of greater than 80° to said pipeline.

14. A method according to claim 11, wherein said pig train is launched from a pipe at a pressure in the range of 0.4-15 bar.

15. A method according to claim 1, wherein said pig train travels through an obstruction in said pipeline and is operative thereafter.

16. A method according to claim 15, wherein said obstruction is selected from the group consisting of a encrustation, tuberculation, butterfly valve, a wedge, a nail, a screw, an obstructing element, an in-pipe meter, a service pipe ferrule, a baffle, a broomstick seal and combinations thereof.

* * * * *